United States Patent
McCoy et al.

(10) Patent No.: US 12,128,308 B2
(45) Date of Patent: Oct. 29, 2024

(54) GAME ENVIRONMENT CUSTOMIZED GENERATION OF GAMING MUSIC

(71) Applicant: Sony Interactive Entertainment LLC, San Mateo, CA (US)

(72) Inventors: Charles McCoy, San Diego, CA (US); True Xiong, San Diego, CA (US)

(73) Assignee: Sony Interactive Entertainment LLC, San Mateo, CA (US)

( * ) Notice: Subject to any disclaimer, the term of this patent is extended or adjusted under 35 U.S.C. 154(b) by 114 days.

(21) Appl. No.: 17/871,303

(22) Filed: Jul. 22, 2022

(65) Prior Publication Data
US 2024/0024776 A1   Jan. 25, 2024

(51) Int. Cl.
A63F 13/00   (2014.01)
A63F 13/426   (2014.01)
A63F 13/54   (2014.01)
A63F 13/69   (2014.01)

(52) U.S. Cl.
CPC ............ *A63F 13/54* (2014.09); *A63F 13/426* (2014.09); *A63F 13/69* (2014.09); *A63F 2300/6081* (2013.01)

(58) Field of Classification Search
CPC .................................. A63F 13/45; A63F 13/00
See application file for complete search history.

(56) References Cited

U.S. PATENT DOCUMENTS

| 7,674,966 B1 * | 3/2010 | Pierce .................. G10H 1/0025 84/610 |
| 2020/0188790 A1 | 6/2020 | Galuten |
| 2020/0312287 A1 | 10/2020 | Galuten |

OTHER PUBLICATIONS

Super Mario 64 walkthrough—https://youtu.be/Yahw-4bFYjY?si=rlToPn51E3tqlcWq (Year: 2020).*

* cited by examiner

*Primary Examiner* — David L Lewis
*Assistant Examiner* — Eric M Thomas
(74) *Attorney, Agent, or Firm* — John P. Teresinski; Stites & Harbison, PLLC

(57) ABSTRACT

System, process and device configurations are provided for game environment customized generation of gaming music. A method can include detecting a gameplay location for a game environment of an electronic game and at least one environmental parameter for the gameplay location. Gaming music based may be updated based on the at least one environmental parameter to account for one or more of proximity to gaming objects and landscape descriptions for openness and enclosed spaces. Gameplay locations may be detected based on a mapping of the game environment for two-dimensional (2D) and three-dimensional (3D) mapping. Gaming music may be updated to adjust parameters for generating the gaming music based on emotional impact data of the location and direction of one or more objects in the gameplay location relative to a user character. Coordination of music and game environments may provide an immersive and intuitive sense of objects.

20 Claims, 3 Drawing Sheets

GAME ENVIRONMENT CUSTOMIZED GENERATION OF GAMING MUSIC

CROSS-REFERENCE TO RELATED APPLICATION

This application is concurrently filed with U.S. patent application Ser. No. 17/871,276 titled USER PREFERENCE CUSTOMIZED GENERATION OF GAMING MUSIC, U.S. patent application Ser. No. 17/871,279 titled USER INTERACTION CUSTOMIZED GENERATION OF GAMING MUSIC, U.S. patent application Ser. No. 17/871,294 titled CUSTOMIZED AUDIO SPECTRUM GENERATION OF GAMING MUSIC, and U.S. patent application Ser. No. 17/871,2307 titled INTERFACE CUSTOMIZED GENERATION OF GAMING MUSIC, the specifications of which are hereby expressly incorporated by reference in their entirety.

FIELD

The present disclosure is directed to generating audio for electronic games and customizing game audio and gaming music, including music orchestration, music learning, game design and game generation.

BACKGROUND

Music in electronic games (e.g., video games, computer games, gaming platforms, application-based games, etc.) is generally pre-recorded and played as a loop to accompany video components of the game. Games can often include multiple music recordings for output, the recordings generated during development of a game. There is a desire to increase personalization of music and audio for games and gaming content beyond prerecorded loops. For many electronic games, there is no option or ability of a user to modify music or audio accompaniment beyond controlling volume. Muting game volume may also mute sound effects and other audio output of the game. There exists a desire for personalization of gaming content.

Another issue with game systems is the need to format game elements for different gaming markets. Gaming has a worldwide fan base serving many game titles and different regions. Certain features of a game, such as a musical style, may not be well received by game players. Development for additional markets and regions may be costly and impose additional data requirements for storage. Another difficulty of personalizing games and gaming content is identifying features that will enhance the experience of a user. There exists a need and desire for customized gaming music to compliment user experience.

BRIEF SUMMARY OF THE EMBODIMENTS

Disclosed and described herein are systems, methods and configurations for game environment customized generation of gaming music. In one embodiment, a method is provided for detecting, by a device, a gameplay location for a game environment of an electronic game, and detecting, by the device, at least one environmental parameter for the gameplay location. The method also includes updating, by the device, gaming music based on the at least one environmental parameter, and outputting, by the device, updated gaming music.

In one embodiment, the gameplay location is detected based on a mapping of the game environment.

In one embodiment, the game environment includes at least one of a two-dimensional (2D) and three-dimensional (3D) mapping, the game environment including at least one gaming object.

In one embodiment, the at least one environmental parameter includes proximity to at least one gaming object.

In one embodiment, the at least one environmental parameter is a landscape parameter including a rating of openness for the gameplay location.

In one embodiment, updating the gaming music includes adjusting a parameter for generating the gaming music based on emotional impact data of the location.

In one embodiment, updating the gaming music includes changing at least one parameter for generating the gaming music based on a threat rating for one of more objects associated with the gameplay location.

In one embodiment, updating the gaming music includes modifying at least one sound effect for the gameplay location.

In one embodiment, updating the gaming music includes modifying a parameter for generating the gaming music based on direction of one or more objects in the gameplay location relative to a user character.

In one embodiment, the method includes generating output to at least one game controller based on the updated gaming music.

Another embodiment is directed to directed to a device configured for game environment customized generation of gaming music. The device includes a memory storing executable instructions and a controller, coupled to the memory. The controller is configured to detect a gameplay location for a game environment of an electronic game, and detect at least one environmental parameter for the gameplay location. The controller is also configured to update gaming music based on the at least one environmental parameter, and output updated gaming music.

Other aspects, features, and techniques will be apparent to one skilled in the relevant art in view of the following detailed description of the embodiments.

BRIEF DESCRIPTION OF THE DRAWINGS

The features, objects, and advantages of the present disclosure will become more apparent from the detailed description set forth below when taken in conjunction with the drawings in which like reference characters identify correspondingly throughout and wherein.

DETAILED DESCRIPTION OF THE EXEMPLARY EMBODIMENTS

Overview and Terminology

Figure 1:
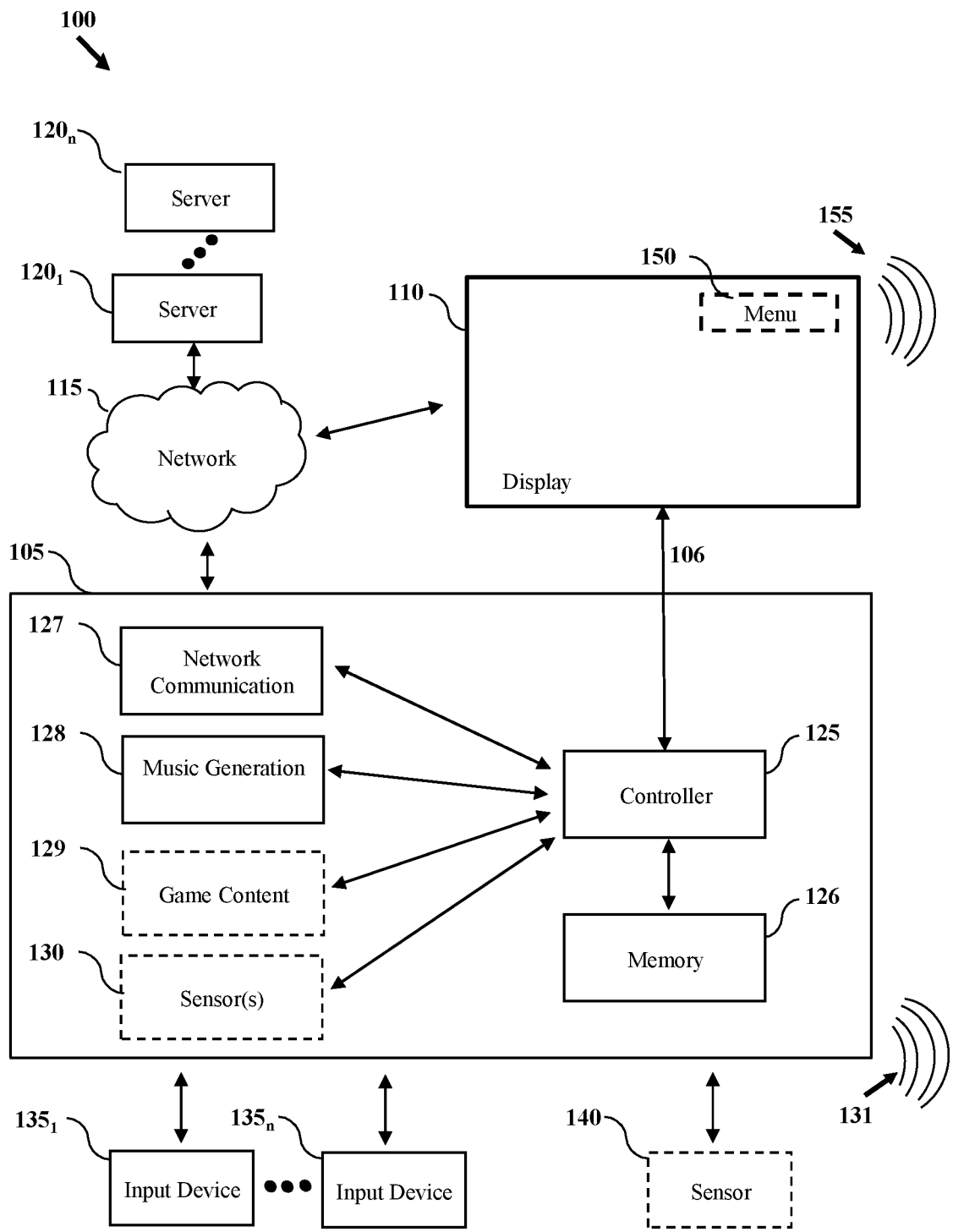
FIG. 1 is a graphical representation of customized music generation according to one or more embodiments.

One aspect of the disclosure is directed to generating customized game audio, such as gaming music and gaming sound effects. By customizing operations and audio generation, gaming audio may be more personalized and output may be tailored to a user, user environment and user condition.

Embodiments are directed to game environment customized generation of gaming music. Systems and methods can include determining a gameplay location, at least one environmental parameter for the gameplay location, and updating faming music based on the environmental parameter. Customization of audio and gaming music can have a large impact on a gaming experience. According to embodiments, gaming music may be generated based on emotional cues of a game scene, such that changes in a game environment can be detected for updating one or more parameters for generating gaming music. Music may be controlled to be more prominent or less obtrusive to a game state.

Processes and frameworks are provided for enabling devices, such as gaming consoles, and systems to generate game audio. Features discussed herein referring to gaming music may be applied to other types of audio, including but not limited to sound effects. In addition, generating gaming music as discussed herein may include generating musical and/or non-musical audio accompaniment for an electronic game. It should be appreciated that gaming music may include one or more sound voicings, such as vocal and/or instrumental sounds in such a way as to produce a sounds which can include an arrangement of sound having melody, rhythm and in some cases harmony. Gaming music may be generated as one or more tracks for output. According to embodiments, gaming music is generated and output dynamically, such that the audio output is determined and output by a device during gameplay.

According to embodiments, gaming music and audio may be updated based on changes in a gameplay environment, including the location of a user within a game and one or more objects in the vicinity of the user. According to embodiments, systems and methods are provided for generating music as a game is played to respond to details about the current game environment. In contrast to a traditional game that includes a soundtrack that loops while a player is in an area of the map and a different soundtrack that loops when the player is in a second area, embodiments may account for more than just the player location. According to embodiments, to provide a user with a more immersive experience and increased feel, music may be generated during gameplay and updated to change organically and feel more constrained when the player changes environments, such as from a wide-open space to being under tree cover or being between big rock formations. One or more parameters for generating gaming music may be updated based on the gameplay location to provide users meaningful music changes during gameplay and exploration of a gaming environment.

As used herein, the terms "a" or "an" shall mean one or more than one. The term "plurality" shall mean two or more than two. The term "another" is defined as a second or more. The terms "including" and/or "having" are open ended (e.g., comprising). The term "or" as used herein is to be interpreted as inclusive or meaning any one or any combination. Therefore, "A, B or C" means "any of the following: A; B; C; A and B; A and C; B and C; A, B and C". An exception to this definition will occur only when a combination of elements, functions, steps or acts are in some way inherently mutually exclusive.

Reference throughout this document to "one embodiment," "certain embodiments," "an embodiment," or similar term means that a particular feature, structure, or characteristic described in connection with the embodiment is included in at least one embodiment. Thus, the appearances of such phrases in various places throughout this specification are not necessarily all referring to the same embodiment. Furthermore, the particular features, structures, or characteristics may be combined in any suitable manner on one or more embodiments without limitation.

Exemplary Embodiments

FIG. 1 is a graphical representation of system for customized music generation according to one or more embodiments. According to embodiments, customized music generation may be provided by a device and/or a system. A system can include one or more components and devices. FIG. 1 illustrates system 100 according to embodiments which can include device 105. Device 105 may be one or more of a gaming console, computing device and electronic device in general configured to output gaming content 106 to a display. With respect to gaming content, device 105 may be configured to output data for presentation by a display, or visual output device in general, including graphics (2D and 3D), sound and data. Device 105 may also be configured to output non-gaming content, such as video content, visual content, audio content, etc. Embodiments describe generating dynamic gaming music for electronic games and gaming, however it should be appreciated that the principles of the disclosure may be applied to other forms of media and non-gaming content. As such, device 105 and system 100 may be used to generate customized music for one or more applications.

According to embodiments, device 105 is configured to output data 106 and/or content to display 110. According to embodiments, display 110 may be separate from or part of device 105. Device 105 may be configured for network communication by way of network 115 with one or more servers $120_{1-n}$. Device 105 may be configured to receive one or more of user data, game data and music data from servers $120_{1-n}$. Servers $120_{1-n}$ may be configured to store one or more of user data, game data and music data.

FIG. 1 depicts a device configuration according to embodiments. Device 105 may relate to a console, media device, and/or handheld device configured for generation of gaming music. According to embodiments, device 105 includes controller 125, and memory 126. Device 105 may also include network communication module 127, and music generation module 128. Device 105 may also optionally include game content 129 and one or more sensors 130.

Controller 125 may relate to a processor or control device configured to execute one or more operations stored in memory 126, such as processes for generation of gaming music. Controller 105 may be coupled to memory 126, network communication module 127, and music generation module 128. Memory 126 may be non-transitory memory configured to provide data storage and working memory operations for device 105. Memory 126 may be configured to store computer readable instructions for execution by controller 125 for one or more processes described herein. Network communication module 127 may be a communications module configured to receive and transmit network communication data. According to one embodiment, controller 125 may be configured to determine one or more parameters and user preferences for gaming music. One or more of user preferences, interactions and parameters for dynamic music generation may be determined and used by controller 125. According to embodiments, music generation module 128 may perform music generation operations. Music generation module 128 may include voicings, musical motifs, musical patterns and parameters to generate music for a game, including prior to, during and post-gameplay. In addition to gaming, dynamic music generation may be performed for presentation of menus and/or in association with operations of device 105 to act as a gaming console. Music generation module 128 may be configured to perform one or more learning or training operations to allow for music generation. Music generation module 128 may also store one or more data parameters for use in generating gaming music.

Device 105 may be configured to receive gaming media (e.g., card, cartridge, disk, etc.) and output visual and audio content of the gaming media to display 110. Device 105 may be configured to receive data from one or more of servers $120_{1-n}$ to present and output game content, which may be stored in memory 126. For network games, device 105 may receive game data from a network source, such as servers $120_{1-n}$, and may be configured to generate gaming music for the game data.

According to embodiments, device 105 may include one or more optional sensors 130. Optional sensors 130 may include one or more of audio (e.g., sound), optical (e.g., camera) and spatial (e.g., presence, proximity, etc.) sensors for one or more of collecting user feedback, sensing user environment and for generating gaming music in general. Device may include one or more speakers to generated audio output, shown as audio 131. When connected to an external device, such as display 110, one or more speakers of the external device may be used to output audio.

Device 105 may be configured to receive input from one or more peripheral devices, such as input devices $135_{1-n}$. Input devices $135_{1-n}$ may be controllers or input devices in general configured to provide controls for device 105 and game control. According to embodiments, Input devices $135_{1-n}$ may be configured to provide feedback to a user. Input devices $135_{1-n}$ may include one or more output elements, including but not limited to accessibility elements to output tactile or sensory features (e.g., braille output, vibration output, light elements) to provide output to accompany game or audio output. By way of example, input devices $135_{1-n}$ may provide output in the form of a tactile or haptic output to signify audio output or changes in audio output. Device 105 may be configured to operate with one or more external sensors, such as optional sensor 140. Optional sensor 140 may be configured to detect audio in the location of a user, and/or presence of viewers. Display 110 may include sensors, such as optional sensors 140.

System 100 may include display 110 for output of visual and audio of an electronic game and/or output of device 105. According to embodiments, display 110 may display control elements of device 105, such as optional menu 150, which may be used to interface with device 105. Display 110 may output audio 155 based on data 106 received from device 105.

According to embodiments, device 105 may be configured to generate gaming music based on user preferences. According to other embodiments, device 105 may be configured to generate gaming music based on user interactions with a gaming system. In other embodiments, device 100 may generate gaming music based on parameters for customized audio spectrum generation. In yet other embodiments, device 100 may generate gaming music based on parameters for gameplay environment customization. Device 100 may utilize one or more operations of processes 200, 300 and 400 and processes in general described herein. It should also be appreciated that system 100 and its components may be configured to perform operations of device 105.

System, devices and processes are described herein to generate gaming audio, such as gaming music. According to embodiments, gaming audio may be generated dynamically, such that it is not pre-constructed. Dynamic gaming music may be generated to include audio having one or more of a melody, rhythm, and harmony. Dynamic gaming music may be generated to include one or more tones (e.g., notes), tone progressions, rhythmic beats, and percussive elements provided by one or more musical voicings (e.g., instruments, synthesizers, etc.). Unlike conventional gaming music which is prerecorded, dynamic gaming music may be generated by system 100 or device 105 for a current gaming situation, player and gameplay environment. Dynamic music may be generated using one or more motifs trained to include one or more of melody, rhythm, and harmony components, such that device 105 may use a motif to generate audio output for the game based on a game situation and/or one or more parameters. In the context of user preference customized generation of gaming music, device 105 may generate music for the launch screen of a game title, such that one or more music motifs are selected, and the device selects one or more voicings for the motifs based on the game. According to embodiments, selection of a motif, selections of voicings and output of the motif may be based on a user preference. As discussed herein, electronic gaming is a worldwide activity, accordingly popular music in one region of the world may favor music with strong rhythmic components, whereas another region may favor mare ambient sounds. Moreover, a user preference may not match with musical styles associated with a region. Embodiments allow for tailoring and modifying dynamic music to account for a particular user without requiring a game developer to generate a near infinite number of pre-recorded tracks.

By providing dynamic gaming music, system 100 and device 105 can provide many forms of musical output. According to embodiments, user preference customized generation of gaming music is provided to customize dynamically generated gaming music to provide a more personalized experience. Technically, dynamically generated gaming music does not require pre-recording of music for each user's preference. As discussed herein user preference can include one or more preferences directed to a musical style, genre, specific title, indications of preferred types of music, music identified for certain gaming activities, user feedback, country of origin, worldwide region, language preference and even user environment.

Figure 2:
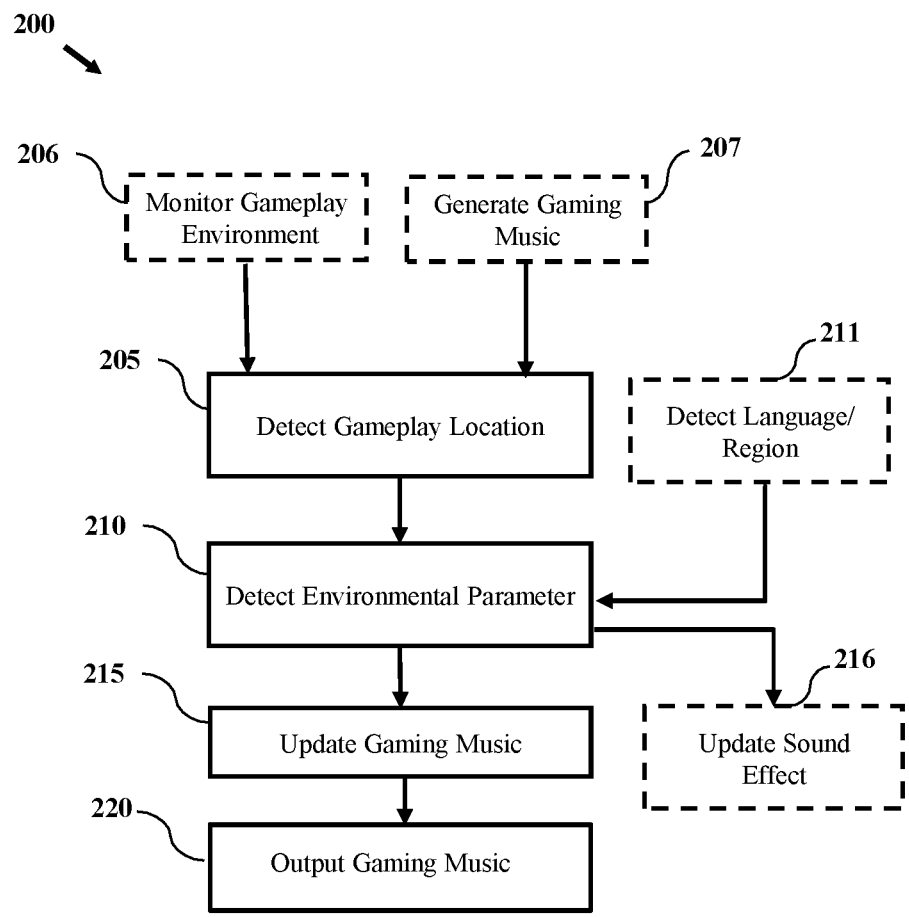
FIG. 2 illustrates a process for gameplay environment customized music generation according to one or more embodiments.

FIG. 2 illustrates a process for game environment customized music generation according to one or more embodiments. Process 200 may detect one or more characteristics of a game environment to generate gaming audio, including gaming music. Process 200 may be employed by a device, such as device 105 and/or controller 125 of FIG. 1, to generate gaming music based for one or more users (e.g., players) of a game. Process 200 may also be performed to aid in generating dynamically generated music.

Dynamic generated game audio may be generated for a current game situation, that is not pre-constructed, and as such, can provide flexibility to customize the audio to one or more of a current gaming situation and player that will hear the audio. Process 200 provides solutions to convey information about a current gaming environment to a user. Process 200 may be initiated by a device (e.g., device 105) detecting a gameplay location at block 205.

According to embodiments, the game play location may be determined based on a location in the game environment. According to embodiments, a game environment may be one or more of a 2D, 2D scrolling, 2D first person view, and 3D configuration, the environment also including a map or layout. The gameplay location may be a display position of a player controlled object. According to embodiments, the game play location may be a reference point for determining a view of the game environment. In a game including a player controlled object (e.g., character, vehicle, object in general, etc.), a gameplay location is determined for a player controlled object of a game based on game data, such as a game vector and/or game state. The player controlled object may be a displayed element of the game relative to one or more game objects. According to other embodiments, game play location may be determined based on the display position for the game environment, such as the location racing route in a racing game, environmental location in a first person game, and path in a branch level game of paths. Game environments may be characterized by one or more levels and one or more zones within levels. Game environments may include one or more objects for scenery and non-player elements, including but not limited to non-player characters, pitfalls, enemies, power-ups, etc. Game environments may also include player controlled elements for other users.

Gameplay locations and characteristics may depend on a particular game. According to embodiments, game play location may include one or more of coordinates and location information of a game object, such as a user controlled object in the game environment. Based on the game environment and the game state, one or more objects, such as enemies or scenery, may be in the vicinity of the game play object. In addition, the environment may have one or more spatial characteristics including but not limited to indoor, outdoor, open, enclosed, association with a structure, association with natural features (e.g., wind, water, waves, sand, clouds, etc.). According to embodiments, a game may include metadata for each environment providing a theme or emotion to be associated with the environment. According to embodiments, music may be generated based on location and the change music based on changes in environment. As such, music may be generated to provide an indication of feel, such as a constrained or open feel, relating to the game play environment. Detecting gameplay location at block 205 can include detecting changes in position of a player controlled character, detecting user inputs to control character position, detecting user inputs to modify a screen view, and/or identifying a location in a game map from game data, such as a game vector. Detecting gameplay location at block 205 can include identification of a heading (e.g., direction of travel, direction of view) and one or more input controls for controller game elements.

Detection of the game play environment at block 205 may be based on a mapping of the game environment. Game media or code may output code or data providing an indication of a game play location for at least one of a two-dimensional (2D) and three-dimensional (3D) mapping, the game environment including at least one gaming object. Process 200 may optionally include monitoring the gameplay environment at block 206. Monitoring a gameplay environment may include identifying at least one theme or emotion associated with a gameplay environment which may be user defined and/or provided by a game developer. Process 200 may also optionally include generating game music at block 207 which may be based on one or more of user preferences, game designer metadata, the game environment and theme or emotion from a monitor environment. While having music generated on-the-fly allows the music to convey more detailed information about the current gaming environment, music generation and re-generation should be ongoing throughout a gameplay session. To accomplish this, process 200 may monitor player engagement specifically for user intervention of audio settings such as switching music, sudden pause, drop-off, gameplay pace change, etc. It continues to refine the generated music to create a conducive gaming experience where the gamer is fully immersive in the accompaniment of the generated music.

At block 210, process 200 includes detecting at least one environmental parameter for the gameplay location. According to embodiments, an environmental parameter for the gameplay location includes one or more of an object, grouping of objects and characteristics of the environment. Environmental parameters detected at block 210 can include identification of proximity of an object or objects to the gameplay location. Environmental parameters may depend on a particular game, game type and level of a game. According to embodiments, an environmental parameter may depend on a view, such as a displayed view, of a game environment. Environmental parameters detected at block 210 may characterize the gameplay location, including a rating of openness for the game play location. The rating may be a parameter for generating gaming music such that environments that are open or expansive, such as a field, large room, or landscape may be identified to generate music to accompany the feel of the environment. Similarly, ratings for environments with closed or constrained spaces, such as an indoor space, under a tree cover or within a cave may be identified to generate music with a closed feel. Detection of an environmental parameter may include detection of a landscape parameter including a rating of openness for the gameplay location. A landscape parameter may identify the type of landscape associated with the gameplay location and/or game environment. According to embodiments, a landscape parameter may provide a description or keyword of the landscape of the game that may be used to select parameters for generating gaming music. Exemplary landscape terminology may be field, space, cave, tunnel, cloud, desert, etc. One or more parameters for a rating, environmental identifier, feel, emotion and mood may be identified at block 210 and utilized as parameters for generating gaming music. Detection of an environmental parameter may include detection of an object and/or proximity to an object. For example, detecting proximity to a grouping of trees or forest may be used as a parameter for generation of music. Detecting proximity to an enemy or sound source may be used as a parameter for generating and output of sound effects for the enemy or sound source.

Detection of gameplay objects may be detected based on gameplay identifier provided by game code, wherein objects and characteristics may be read to identify sound outputs and characteristic. Accordingly, detecting an environmental parameter may distinguish between types of objects, such as a boss or trophy. In addition, directionality may be determined for one or more objects relative to a gameplay location to coordinate music output based on direction of elements and view of gameplay character. Process 200 allows for music to be updated as a player moves and based on elements present in the game environment. By generating music dynamically, desired emotions may be evoked in a user detailed information about the current gaming environment may be conveyed.

Detecting environmental parameters can include proximity to at least one gaming object. In some cases, the generated music for certain elements can account for the distance and elements between the various game characters. For example, diminished waterfall sounds can indicate the location of a gamer to a waterfall. When a monster or another character is suddenly in the path between the gamer's character and the waterfall, the sounds can fade more. The game elements can influence aspects of the music that is being generated. The waterfall can have a peaceful influence on the emotional impact and parameters to generate music. If an enemy walks between the waterfall and the player, the enemy element can have a more hostile and threatening emotional impact associated with it, which would change the emotional characteristics of the music generated to reflect the more hostile environment around the player.

According to embodiments, process 200 may optionally include detecting at least one of a langue and region at block 211. Detected languages and regions may be used for selecting one or more motifs, themes and styles for generating gaming music. According to embodiments, detected languages and regions at block 211 may be used for modifying sounds of objects associated with a gameplay location. Based on the detected environmental parameter, such as detection of an object, process 200 may update a sound effect at block 216. Updating a sound effect may also be based on one or more user preferences for a language or region. By updating a sound effect, the sound output or generated for an object may be based on a desired language or region. By way of example, the generated music for certain elements should reflect the language spoken by the gamer. Similarly, sound effects may be controlled. Animal sounds are different in different languages. In English, a dog bark sound may be "woof", whereas in German, the sound is "wau". An in-game dog for an American or English-speaking gamer would make "woof" instead of "wau". Updating a sound effect at block 216 can account for gamer language and cultural differences to localize the sound to more familiar sounds.

At block 215, process 200 includes gaming music based on at least one environmental parameter. Updating the gaming music can include modifying at least one sound effect for the gameplay location. Gaming music may be updated at block 215 to select one or more parameters for generating music based on one or more detected environmental parameters. By way of example, in a gaming environment including a character traversing one or more levels, transition to a level or sub-level with a lighter or darker color scheme result in updated gaming music reflective of the color. According to embodiments, changing location from an open space to a confined space, such as a character entering a tunnel, cave, or vehicle may result in update of the music based on a change in openness. According to embodiments, updating the gaming music includes adjusting a parameter for generating the gaming music based on emotional impact data of the location. Gameplay locations may include one or more forms of metadata that may be read and/or accessed by a device including emotions assigned with the location. For an upbeat location, gaming music may be updated to reflect a sense of accomplishment with ascending through the level to the upbeat location.

According to embodiments, updating the gaming music includes changing at least one parameter for generating the gaming music based on a threat rating for one of more objects associated with the gameplay location. One or more hazards or enemies in a game may be indicative of a threat to a user controlled character. To indicate the presence of such a threat, gaming music may be generated with one or more motifs, melody patterns and rhythms selected to evoke and/or communicate the threat.

According to embodiments, updating gaming music at block 215 may include updating music output based on game objects associate with a gameplay location having a sound output. By way of example, a waterfall object having a sound output for water may necessitate updating of game music associated with one or more themes or motifs selected based on proximity to the waterfall element. Updating game music may be performed to update sound based on direction or view presented. Movements of a character closer to or away from an object may be incorporated into music. Updating music at block 215 may include changes in languages or sounds for objects.

At block 220, process 200 includes outputting updated gaming music. According to embodiments, game music may be output by a device to one or more device speakers and/or to another device such as a display unit with speakers and/or sound system. Output of gaming music may include generating output to at least one game controller based on the updated gaming music. Output to a controller may compliment sound output and may assist with users having unable to hear audio output. Output to a controller can include one or more of vibration, a series of vibrations and tactile output (e.g., braille output, etc.). In some cases, the generated music for certain elements can extend to the braille area on the remote controller to enable a blind and visually impaired gamer to read and interpret the game location and game environments. Generation can include an output track for controller area that includes the information, such as emotional impact and proximity to elements, that it is trying to convey about game elements so that hearing impaired players can access that information through touch.

Figure 3:
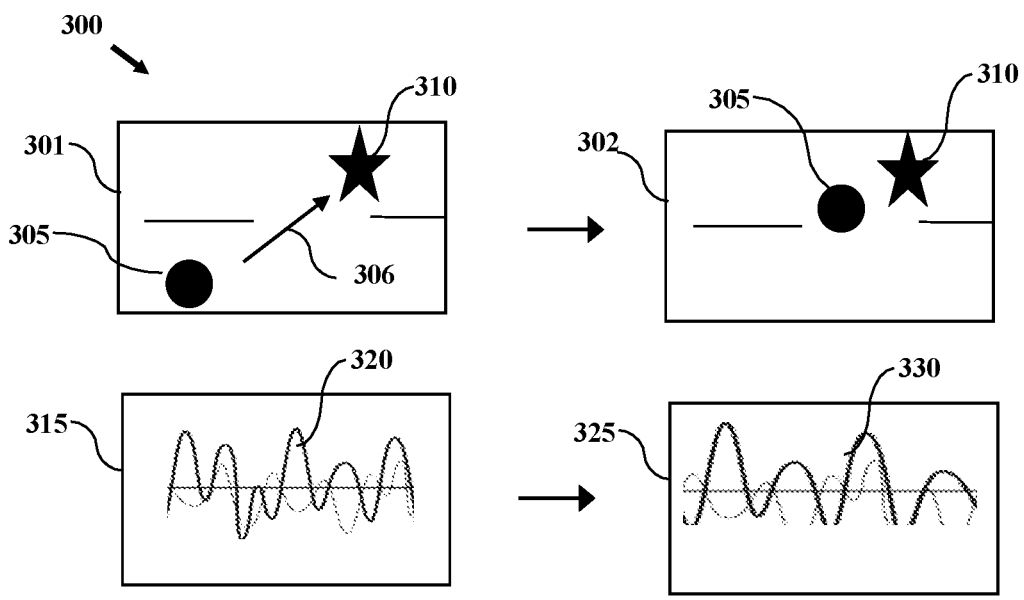
FIG. 3 illustrates a graphical representation of gameplay environment customization according to one or more embodiments.

FIG. 3 illustrates a graphical representation of game location customization according to one or more embodiments. According to embodiments, generating gaming music and generating game audio may be based on game location and game elements present to define one or more attributes of the music and/or audio to be output. Game location and elements may be used to define and/or select motifs that may be combined.

According to embodiments, process 300 may be performed by a device for customization of music for game environment 301 including object 305 in a first location. Object 205 may be a player controlled object and game environment 301 may be one sample or portion of game play environments as a whole. Game environment includes game object 310, which may be a game controlled element (e.g., enemy, non-player character, etc.) or displayed element having a sound associated with the element. Process 300 may include generating gaming music 315 based of the location of game object 305 in game environment 301 and one or more characteristic of game environment 301. Gaming music 315 may include one or more characteristics 320, such as a melody or feel, based on game environment 301. In some cases, the generated music can be rendered based on a 3D model of sound sources so that the direction that musical elements are coming from can be coordinated with the direction to certain things in the game environment. Such coordination between the music and the game environment can make the game environment seem more immersive as it gives the player a more intuitive sense of the location of certain elements in the game environment According to embodiments, player controls to move object 305, such as movement 306, may be detected and the location of game object 305 may be monitored and detected within game environment 301. Process 300 may include updating gaming music based on one or more of gameplay location of object 305 and a game environment. Process 300 illustrates game play environment 302 including game object 305 in a second location that is closer to game object 310. Process 300 may include generating gaming music 325 based of the location of game object 305 in game environment 302 and one or more characteristic of game environment 302. Gaming music 325 may include one or more characteristics 330, such as a melody or feel, based on game environment 302. Gaming music 325 may be updated from gaming music 315 based on the changes in game environment 302 relative to game environment 301.

According to embodiments, updated gaming music 325 may be generated based on game object 305 moving towards a sound source or game object 310. By way of example, moving to a new location or change in environment, such as a different zone of a game map may lead to changes in gaming music. Similarly, moving to an object (e.g., enemy, boss, trophy, design element, etc.) or group of objects with one or more themes or emotions associated with the gaming element may result in changes in gaming music. Game environment and one or more display elements in the game may change based on player controls and player interaction. In some cases game environment may change based on game play. Location of elements may be based on map or other elements for the game to render environment.

Game elements can have meta-data associated with them when they are communicated to process 300, which can indicate condition of the element, if the element is hostile or beneficial, if a certain emotion should be associated with the element, and type of element. For example, the surroundings around the player may have several plant elements, and process 300 may have certain musical motifs for representing plant elements. As the player controls a game object into different terrane that is dominated by rock formations, process 300 can then react to use a different musical motif that it associates with rock elements.

Figure 4:
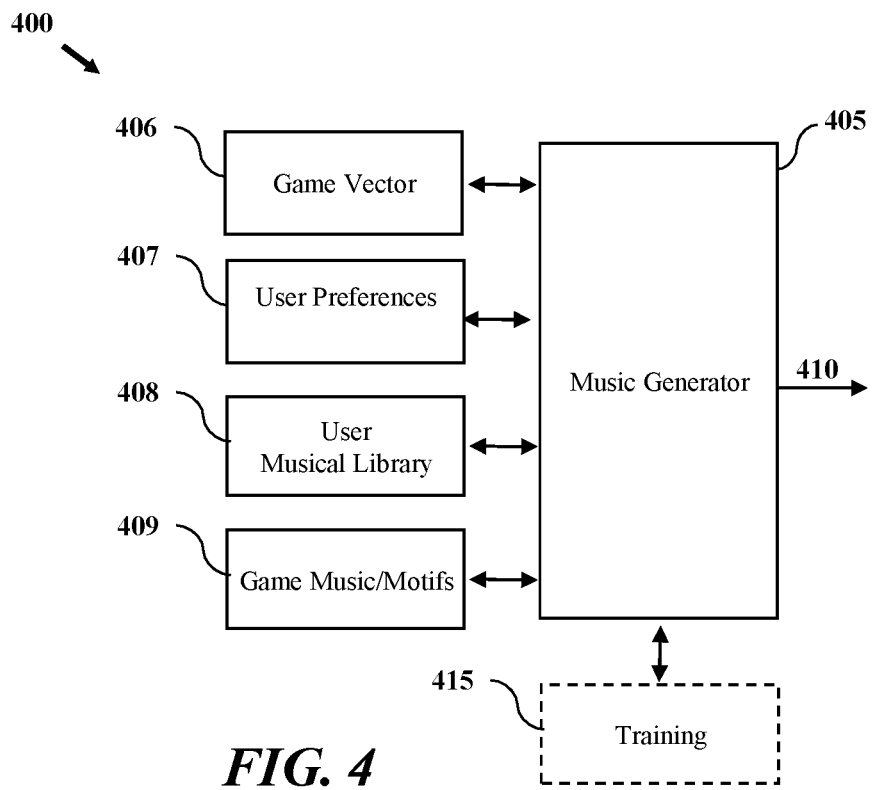
FIG. 4 illustrates a graphical representation of dynamic music generation according to one or more embodiments.

FIG. 4 illustrates a graphical representation of dynamic music generation according to one or more embodiments. According to embodiments, generation of gaming music may be performed dynamically, such that music and/or audio of an electronic game is determined and output during operations of a game. Dynamic music generation may employ use of one or more motifs that may be used to generate output. According to embodiments, dynamic gaming music generation 400 is performed by a music generator 405. Music generator 405 may be one or more components of a device, such as a controller or processor of a gaming console or electronic media player. Music generator 405 may be configured to output gaming music 410 based on one or more of game vector 406, user preferences 407, user musical library 408 and game music motifs 409. According to embodiments, a gaming console may generate and/or receive a game vector from game media, the game vector describing one or more operations and states of gameplay. The game vector may include a description of a gameplay scenario, gameplay type or mood associated with one or more game states. The game vector and one or more game states may be used to assess the type of music to generate. User preferences 407 can provide one or more parameters for generating gaming music. User musical library 408 may provide one or more music titles which may be used a reference for generating music. For example, if a music library includes a particular type of music, such as techno, the type of music may be used as a reference for generating similar music. Game music motifs 409 may be provided by one or more of game media and a server to provide one or more musical elements that may be used to generate music. In certain embodiments, gaming music 410 may be generated independently of prerecorded music for a particular title. In other embodiments, gaming music 410 may modify or incorporate one or more game specific motifs.

According to embodiments, dynamic gaming music generation 400 may optionally include training 415 of one or more parameters for generating music. While user parameters may be employed to select, modify and output variations of motifs, the parameters and building blocks for a device to generate music may require training. By way of example, merging of musical styles may require training of rhythmic patterns when combining. Alternatively, parameter combination of certain tones and frequencies may require training to modify tonal or melodic progressions. Accordingly, music generator 405 may receive updated parameters from training 415 for generation of gaming music.

According to embodiments, music generator 405 may generate gaming music 410 as a stream of output to another device (e.g., display, TV, etc.) or one or more speakers. According to embodiments, generated gaming music may include one or more musical phrases that may be output in a looping manner. Gaming music 410 may include one or more tracks (e.g., lead track, bass track, rhythm track, etc.) that may be independently controlled.

Figure 5:
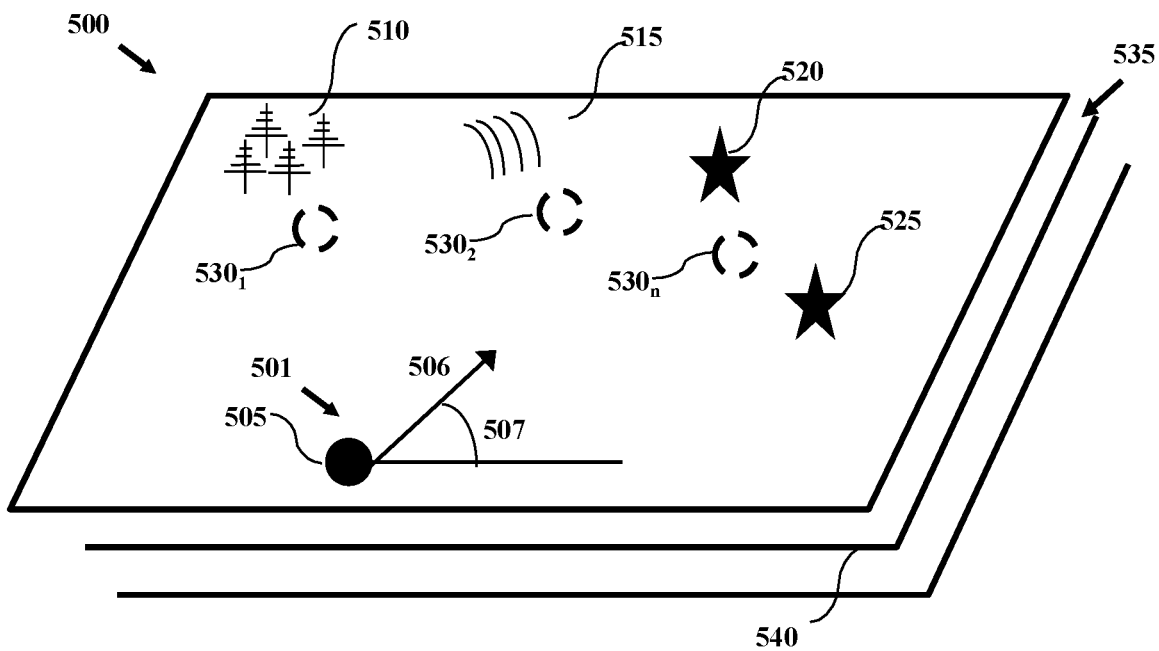
FIG. 5 illustrates a graphical representation of gameplay environment according to one or more embodiments.

FIG. 5 illustrates a graphical representation of gameplay environment according to one or more embodiments. Gameplay environment 500 may include one or more objects and display of a game may show one or more portions of gameplay environment during the game. According to embodiments, gameplay environment 500 can be categorized by one or more parameters describing one or more of a type of gameplay location and objects within the gameplay location. According to embodiments, gameplay environment 500 may detect a gameplay location 501. Game play location 501 may be associated with the location of a gameplay object 505. According to other embodiments, gameplay location 501 may be used as point of reference for rendering a view of a game. Processes and device configurations may detect gameplay location 501 and one or more views to present for gameplay environment 500. By way of example, a device may detect direction 506 relative to one or more references, such as angle 507 and based on gameplay location 501 within the environment. According to embodiments, gaming music may be generated based on the type of environment associated with gameplay location 501 and one or more objects within proximity. For purposes of discussion, gameplay location 501 may relate to a portion of gameplay environment with no objects in proximity. Gameplay environment include objects 510, 515, 520 and 525.

Gameplay environment 500 may include a map or design configuration including one or more of a 2D, 2D scrolling, 2D into screen, 3D, and multilayered configuration with the location of objects controlled by a game and game code. During gameplay, object 505 may be controlled by a user and objects of gameplay environment 500 may be controlled by the graphical controller of the game. In contrast to simply outputting prerecorded music track in a loop based on a location, embodiments can update gaming music based on one or more objects and/or gameplay location 501. In addition, sounds may be coordinated based on location, such that the direction of sound effects of objects may be controlled based on location and/or view of gameplay location 501.

According to embodiments, movement of gameplay object 505 towards one or more locations within gameplay environment 500 may be detected. Exemplary locations for movement of gameplay object 505 are shown as locations $530_{1-n}$. Object 505 may be controlled to move to locations $530_{1-n}$. Object 510 may relate to a grouping of objects, such as a group of trees, such that detection of gameplay object 505 in location 530₁ may include generating gaming music based on the grouping of objects. Object 515 may relate to an object with a sound effect, such as a waterfall, such that detection of gameplay object 505 in location 530₂ may include generating gaming music based on and/or in coordination with the sound effect for object 515. Objects 520 and 525 may be one or more game controlled objects such as bosses or enemies. Detection of gameplay object 505 in location 530$_n$ may include generating gaming music based on and/or in coordination with objects 520 and 525.

According to embodiments, presentation of gameplay environment 500 may be based on one or more layers 535 for game. Layers 535 may include audio layer 543 which may include data for generating gaming music based on coordinates of objects with sounds. According to embodiments, audio layer 540 may include one or more of emotions, motifs and preferences for generation of dynamic gaming music based on locations of gameplay object 505.

According to embodiments, updating gaming music may be based on changes to levels of a game, such as changes to the mapping design elements of layers 535. Different types of landscapes may be associated with different layers and different portions of an environment layer.

While this disclosure has been particularly shown and described with references to exemplary embodiments thereof, it will be understood by those skilled in the art that various changes in form and details may be made therein without departing from the scope of the claimed embodiments.

What is claimed is:

1. A method for game environment customized generation of gaming music, the method comprising:
    detecting, by a device, a gameplay location for a game environment of an electronic game;
    generating, by the device, gaming music for the electronic game based on the game environment, wherein the gaming music is generated and output dynamically such that audio output is determined and output by the device during gameplay;
    detecting, by the device, at least one environmental parameter for the gameplay location, wherein detection of the at least one environmental parameter includes detection of a landscape parameter including a description of landscape of the game and a rating of openness for the gameplay location;
    updating, by the device, gaming music based on the at least one environmental parameter, wherein the description of the landscape is used to select parameters for generating gaming music and the rating of openness is used for generating gaming music; and
    outputting, by the device, updated gaming music.

2. The method of claim 1, wherein the gameplay location is detected based on a mapping of the game environment.

3. The method of claim 1, wherein the game environment includes at least one of a two-dimensional (2D) and three-dimensional (3D) mapping, the game environment including at least one gaming object.

4. The method of claim 1, wherein the at least one environmental parameter includes proximity to at least one gaming object.

5. The method of claim 1, wherein detecting at least one environmental parameter includes detecting a change in game environment including a change in openness, and wherein updating the game music is based on the change in openness.

6. The method of claim 1, wherein updating the gaming music includes adjusting a parameter for generating the gaming music based on emotional impact data of the location, wherein the emotional impact of the location is based on type of environment and objects in proximity.

7. The method of claim 1, wherein updating the gaming music includes changing at least one parameter for generating the gaming music based on a threat rating for one of more objects associated with the gameplay location, wherein music is generated to communicate a threat.

8. The method of claim 1, wherein updating the gaming music includes modifying at least one sound effect for the gameplay location, wherein detecting proximity to a sound source is used as a parameter for generating the at least one sound effect.

9. The method of claim 1, wherein updating the gaming music includes modifying a parameter for generating the gaming music based on direction of one or more objects in the gameplay location relative to a user character.

10. The method of claim 1, further comprising generating output to at least one game controller based on the updated gaming music.

11. A device configured for game environment customized generation of gaming music, the device comprising:
    a memory storing executable instructions; and
    a controller coupled to the memory, wherein the controller is configured to
    detect a gameplay location for a game environment of an electronic game;
    generate gaming music for the electronic game based on the game environment, wherein the gaming music is generated and output dynamically such that audio output is determined and output by the device during gameplay;
    detect at least one environmental parameter for the gameplay location, wherein detection of the at least one environmental parameter includes detection of a landscape parameter including a description of landscape of the game and a rating of openness for the gameplay location;
    update gaming music based on the at least one environmental parameter, wherein the description of the landscape is used to select parameters for generating gaming music and the rating of openness is used for generating gaming music; and
    output updated gaming music.

12. The device of claim 11, wherein the gameplay location is detected based on a mapping of the game environment.

13. The device of claim 11, wherein the game environment includes at least one of a two-dimensional (2D) and three-dimensional (3D) mapping, the game environment including at least one gaming object.

14. The device of claim 11, wherein the at least one environmental parameter includes proximity to at least one gaming object.

15. The method of claim 1, wherein detecting at least one environmental parameter includes detecting a change in game environment including a change in openness, and wherein updating the game music is based on the change in openness.

16. The device of claim 11, wherein updating the gaming music includes adjusting a parameter for generating the gaming music based on emotional impact data of the location, wherein the emotional impact of the location is based on type of environment and objects in proximity.

17. The device of claim 11, wherein updating the gaming music includes changing at least one parameter for generating the gaming music based on a threat rating for one of more objects associated with the gameplay location, wherein music is generated to communicate a threat.

18. The device of claim 11, wherein updating the gaming music includes modifying at least one sound effect for the gameplay location, wherein detecting proximity to a sound source is used as a parameter for generating the at least one sound effect.

19. The device of claim 11, wherein updating the gaming music includes modifying a parameter for generating the gaming music based on direction of one or more objects in the gameplay location relative to a user character.

20. The device of claim 11, further comprising generating output to at least one game controller based on the updated gaming music.

* * * * *